United States Patent
Kim et al.

(10) Patent No.: US 11,881,728 B2
(45) Date of Patent: Jan. 23, 2024

(54) METHOD FOR CONFIRMING STATE INFORMATION OF WIRELESS CHARGING, AND ELECTRONIC DEVICE THEREFOR

(71) Applicant: Samsung Electronics Co., Ltd., Gyeonggi-do (KR)

(72) Inventors: Yongyoun Kim, Gyeonggi-do (KR); Jaesung Shim, Gyeonggi-do (KR); Myeongsu Oh, Gyeonggi-do (KR); Hojin Jung, Gyeonggi-do (KR); Duho Chu, Gyeonggi-do (KR)

(73) Assignee: Samsung Electronics Co., Ltd

( * ) Notice: Subject to any disclaimer, the term of this patent is extended or adjusted under 35 U.S.C. 154(b) by 391 days.

(21) Appl. No.: 17/273,926

(22) PCT Filed: Sep. 5, 2019

(86) PCT No.: PCT/KR2019/011470
§ 371 (c)(1),
(2) Date: Mar. 5, 2021

(87) PCT Pub. No.: WO2020/050643
PCT Pub. Date: Mar. 12, 2020

(65) Prior Publication Data
US 2021/0313844 A1 Oct. 7, 2021

(30) Foreign Application Priority Data

Sep. 7, 2018 (KR) .......... 10-2018-0107202

(51) Int. Cl.
*H02J 50/80* (2016.01)
*H02J 50/90* (2016.01)
(Continued)

(52) U.S. Cl.
CPC ............ *H02J 50/80* (2016.02); *H02J 7/0029* (2013.01); *H02J 7/0047* (2013.01); *H02J 7/02* (2013.01); *H02J 50/10* (2016.02)

(58) Field of Classification Search
CPC ....................................... H02J 50/90
(Continued)

(56) References Cited

U.S. PATENT DOCUMENTS

2013/0342027 A1* 12/2013 Tsai .......... G06F 1/266
307/104
2014/0306657 A1* 10/2014 Lundgren ............... H02J 50/12
320/108

(Continued)

FOREIGN PATENT DOCUMENTS

JP        6163133       7/2017
KR     20160107776     9/2016

(Continued)

OTHER PUBLICATIONS

PCT/ISA/210 Search Report issued on PCT/KR2019/011470, dated Jan. 3, 2020, pp. 5.

(Continued)

*Primary Examiner* — Edward Tso
*Assistant Examiner* — Ahmed H Omar
(74) *Attorney, Agent, or Firm* — The Farrell Law Firm, P.C.

(57) ABSTRACT

Various embodiments of the present invention relate to an apparatus and a method for identifying wireless charging status information in an electronic device. An electronic device may include a housing including a first plate, a second plate facing away from the first plate, and a side surface member for at least partially surrounding a space between the first plate and the second plate, a display positioned in the space and viewed through the first plate, a (Continued)

conductive coil parallel to the second plate and disposed between the display and the second plate, a wireless charging circuit electrically connected to the conductive coil, a sensor circuit electrically connected to the wireless charging circuit and the conductive coil, and a processor operatively connected with the display, the wireless charging circuit and the sensor circuit, wherein the sensor circuit may receive a first analog ping signal for wireless charging from an external electronic device, through the conductive coil, receive at least one second analog ping signal within a time selected after the first analog ping signal received, count the number of the second analog ping signals received within the selected time, and provide a notification signal to the processor if the number exceeds a first threshold. Other embodiments are also possible.

13 Claims, 14 Drawing Sheets

(51) Int. Cl.
*H02J 50/60* (2016.01)
*H02J 50/10* (2016.01)
*H02J 7/00* (2006.01)
*H02J 7/02* (2016.01)

(58) Field of Classification Search
USPC .......................................................... 320/108
See application file for complete search history.

(56) References Cited

U.S. PATENT DOCUMENTS

| 2018/0054086 | A1 | 2/2018 | Jung |
| 2018/0123379 | A1 | 5/2018 | Ha et al. |
| 2018/0323660 | A1 | 11/2018 | Lee |
| 2018/0351391 | A1 | 12/2018 | Park |
| 2019/0148987 | A1* | 5/2019 | Jung ...................... H02J 50/10 307/104 |
| 2019/0173309 | A1 | 6/2019 | Jung |

FOREIGN PATENT DOCUMENTS

| KR | 20170068307 | 6/2017 |
| KR | 20170102454 | 9/2017 |
| KR | 20170135492 | 12/2017 |
| KR | 20180012961 | 2/2018 |
| KR | 20180017415 | 2/2018 |
| KR | 1020180047800 | 5/2018 |
| WO | WO 2017-176128 | 10/2017 |
| WO | WO201717618 | 10/2017 |

OTHER PUBLICATIONS

PCT/ISA/237 Written Opinion issued on PCT/KR2019/011470, dated Jan. 3, 2020, pp. 4.
KR Notice of Patent Grant dated Feb. 20, 2023 issued in counterpart application No. 10-2018-0107202, 5 pages.
Indian Examination Report dated Dec. 29, 2022 issued in counterpart application No. 202117009611, 6 pages.
European Search Report dated Sep. 10, 2021 issued in counterpart application No. 19856581.4-1202, 10 pages.

* cited by examiner

METHOD FOR CONFIRMING STATE INFORMATION OF WIRELESS CHARGING, AND ELECTRONIC DEVICE THEREFOR

PRIORITY

This application is a National Phase Entry of International Application No. PCT/KR2019/011470, which was filed on Sep. 5, 2019, and claims priority to Korean Patent Application No. 10-2018-0107202, which was filed in the Korean Intellectual Property Office on Sep. 7, 2018, the entire content of each of which is incorporated herein by reference.

TECHNICAL FIELD

Various embodiments of the present invention relate to an apparatus and a method for identifying status information of wireless charging in an electronic device.

BACKGROUND ART

As technology advances, wireless charging technology for wirelessly charging an electronic device is supplied. The wireless charging technology may generate electromagnetic induction or electromagnetic resonance between a transmission coil of a wireless power transmitting unit (e.g., a wireless charging pad) and a reception coil of a wireless power receiving unit (e.g., an electronic device), and thus charge a battery of the wireless power receiving unit.

DISCLOSURE OF INVENTION

Technical Problem

A wireless power receiving unit which supports wireless charging through an electromagnetic induction scheme may perform wireless charging, if a reception coil of the wireless power receiving unit contacts a designated position of a transmission coil of a wireless power transmitting unit or approaches within a specific distance. The transmission coil of the wireless power transmitting unit generates a magnetic field and the reception coil of the wireless power receiving unit may charge the battery of the wireless power receiving unit using an electromagnetic induction principle which induces electricity due to effect of the magnetic field. Hence, the wireless power receiving unit may be subject to a problem that charging efficiency is deteriorated or the battery is not charged, if the distance from the wireless power transmitting unit is over a specific distance or is out of the designated position.

Various embodiments of the present invention may provide an apparatus and a method for providing a wireless charging status in an electronic device (a wireless charging receiving unit).

Solution to Problem

According to various embodiments of the present invention, an electronic device may include a housing including a first plate, a second plate facing away from the first plate, and a side surface member for at least partially surrounding a space between the first plate and the second plate, a display positioned in the space and viewed through the first plate, a conductive coil parallel to the second plate and disposed between the display and the second plate, a wireless charging circuit electrically connected to the conductive coil, a sensor circuit electrically connected to the wireless charging circuit and the conductive coil, and a processor operatively connected with the display, the wireless charging circuit and the sensor circuit, wherein the sensor circuit may receive a first analog ping signal for wireless charging from an external electronic device, through the conductive coil, receive at least one second analog ping signal within a time selected after the first analog ping signal received, count the number of the second analog ping signals received within the selected time, and provide a notification signal to the processor if the number exceeds a first threshold.

According to various embodiments of the present invention, an electronic device may include a housing including a first plate, a second plate facing away from the first plate, and a side surface member for at least partially surrounding a space between the first plate and the second plate, a display positioned in the space and viewed through the first plate, a conductive coil parallel to the second plate and disposed between the display and the second plate, a wireless charging circuit electrically connected to the conductive coil, and a processor operatively connected with the display and the wireless charging circuit, wherein the wireless charging circuit may receive a first analog ping signal for wireless charging from an external electronic device, through the conductive coil, receive at least one second analog ping signal within a time selected after the first analog ping signal received, count the number of the second analog ping signals received within the selected time, and provide a notification signal to the processor if the number exceeds a first threshold.

According to various embodiments of the present invention, an electronic device may include a housing, a display viewed through a part of the housing, a conductive coil, a wireless charging circuit electrically connected to the conductive coil, a sensor circuit electrically connected to the wireless charging circuit and the conductive coil, and a processor operatively connected with the display, the wireless charging circuit and the sensor circuit, wherein the sensor circuit may receive at least one analog ping signal for wireless charging from an external electronic device, through the conductive coil, and identify a wireless charging status of the electronic device based on the number and a strength of the analog ping signals received for a reference time.

Advantageous Effects of Invention

An electronic device and an operating method thereof according to various embodiments may provide a user with wireless charging status information of a wireless power transmitting unit and a wireless power receiving unit.

An electronic device and an operating method thereof according to various embodiments may enhance efficiency of wireless charging, by providing an alignment status of a conductive coil of a wireless power transmitting unit and a conductive coil of a wireless power receiving unit.

BEST MODE FOR CARRYING OUT THE INVENTION

Hereinafter, various embodiments of the present invention will be described in detail with reference to the accompanying drawings. In describing the embodiment of the present invention, if it is determined that a detailed description of a related known function or configuration may unnecessarily obscure the subject matter of the present invention, the detailed description will be omitted. Terms to be described are terms defined in consideration of the functions of the present invention, which may vary according to a user's or operator's intent or practice. Hence, their definition should be made based on contents throughout this specification.

Figure 1:
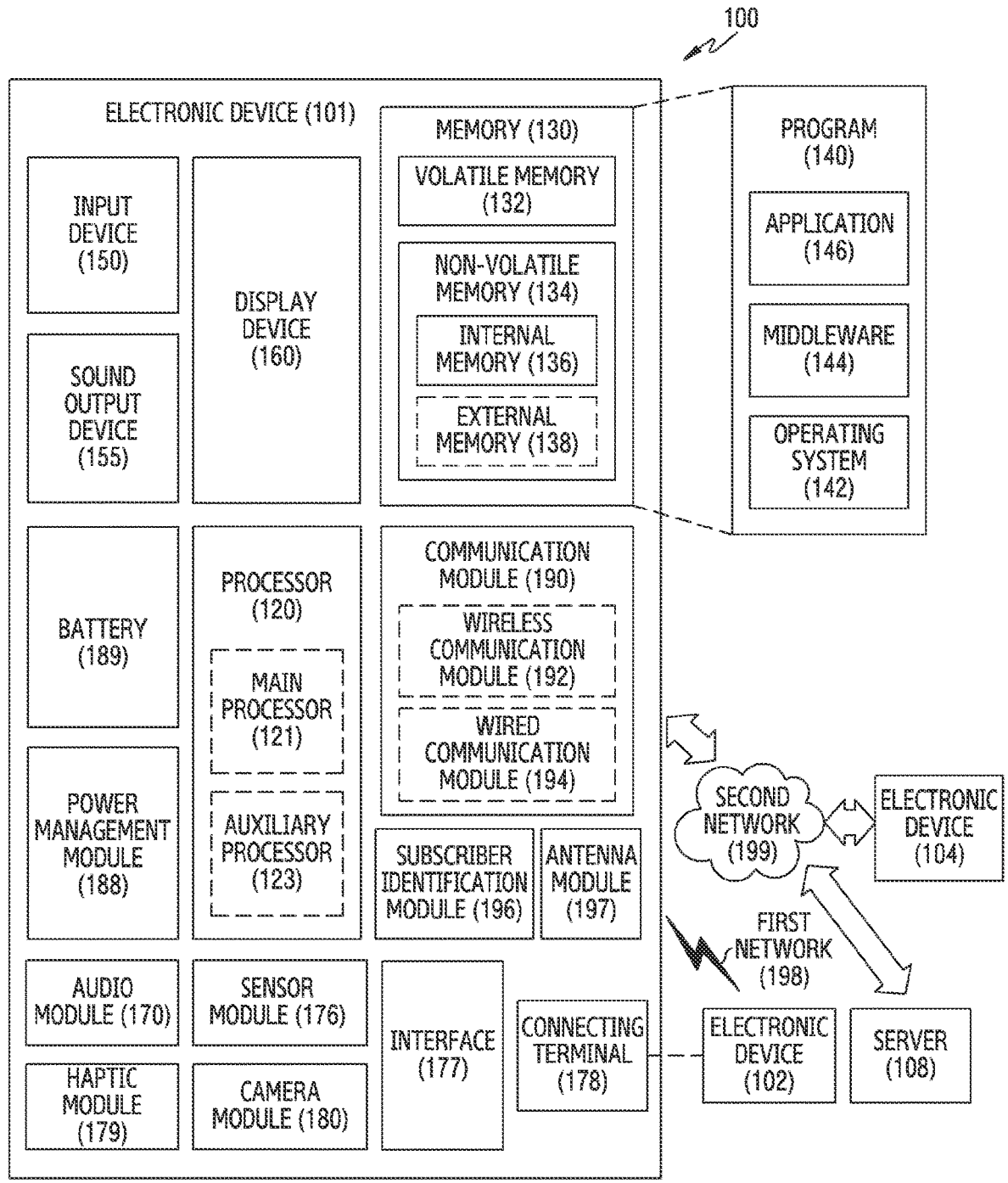
FIG. 1 is a block diagram of an electronic device in a network environment according to various embodiments.

FIG. 1 is a block diagram of an electronic device in a network environment according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, the electronic device 101 may include a reception coil for wireless charging. The processor 120 may include a low-power sensor circuit (e.g., a sensor hub) for controlling the sensor module 176.

Figure 2:
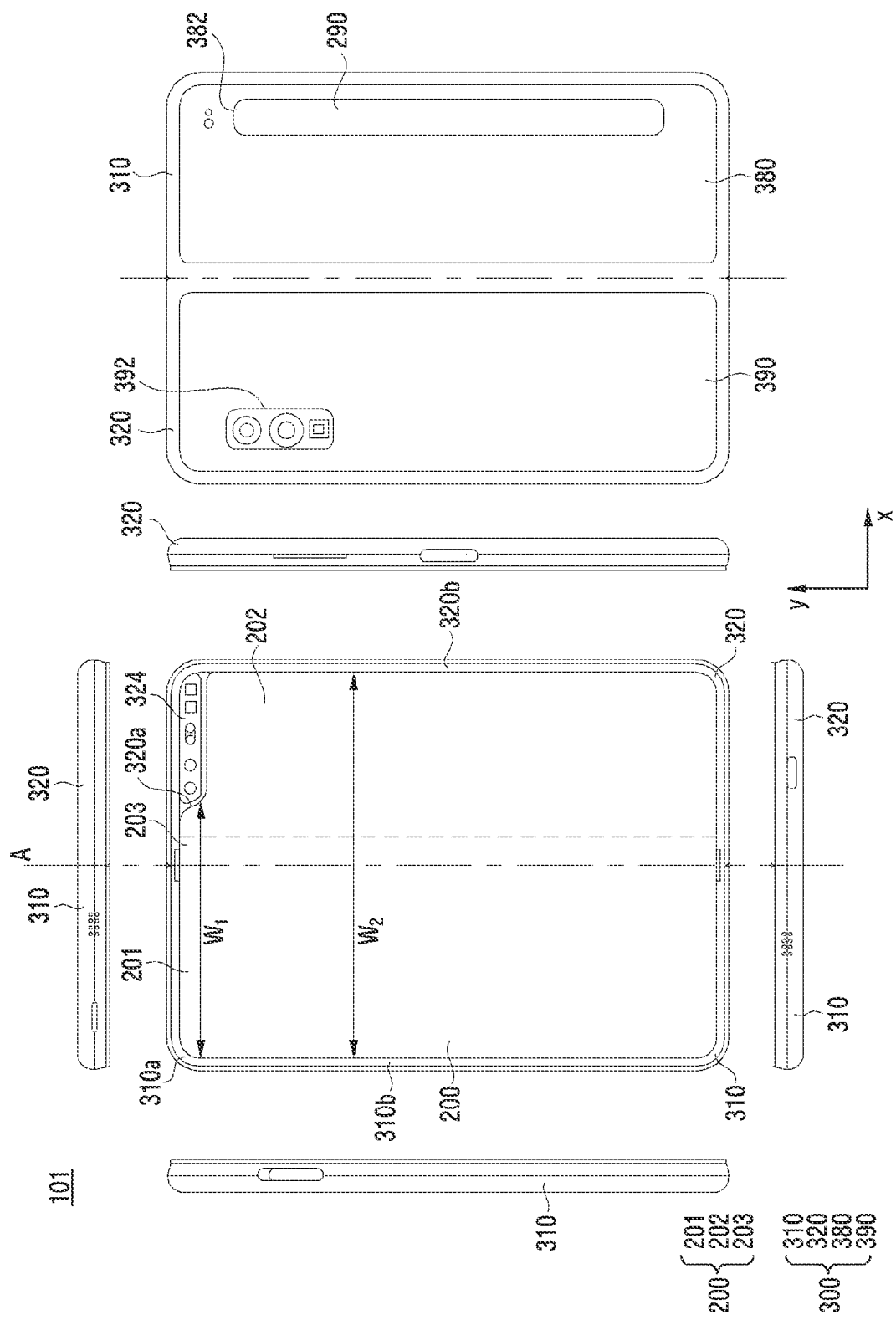
FIG. 2 is a diagram illustrating an unfolded state of an electronic device according to various embodiments.
Figure 3:
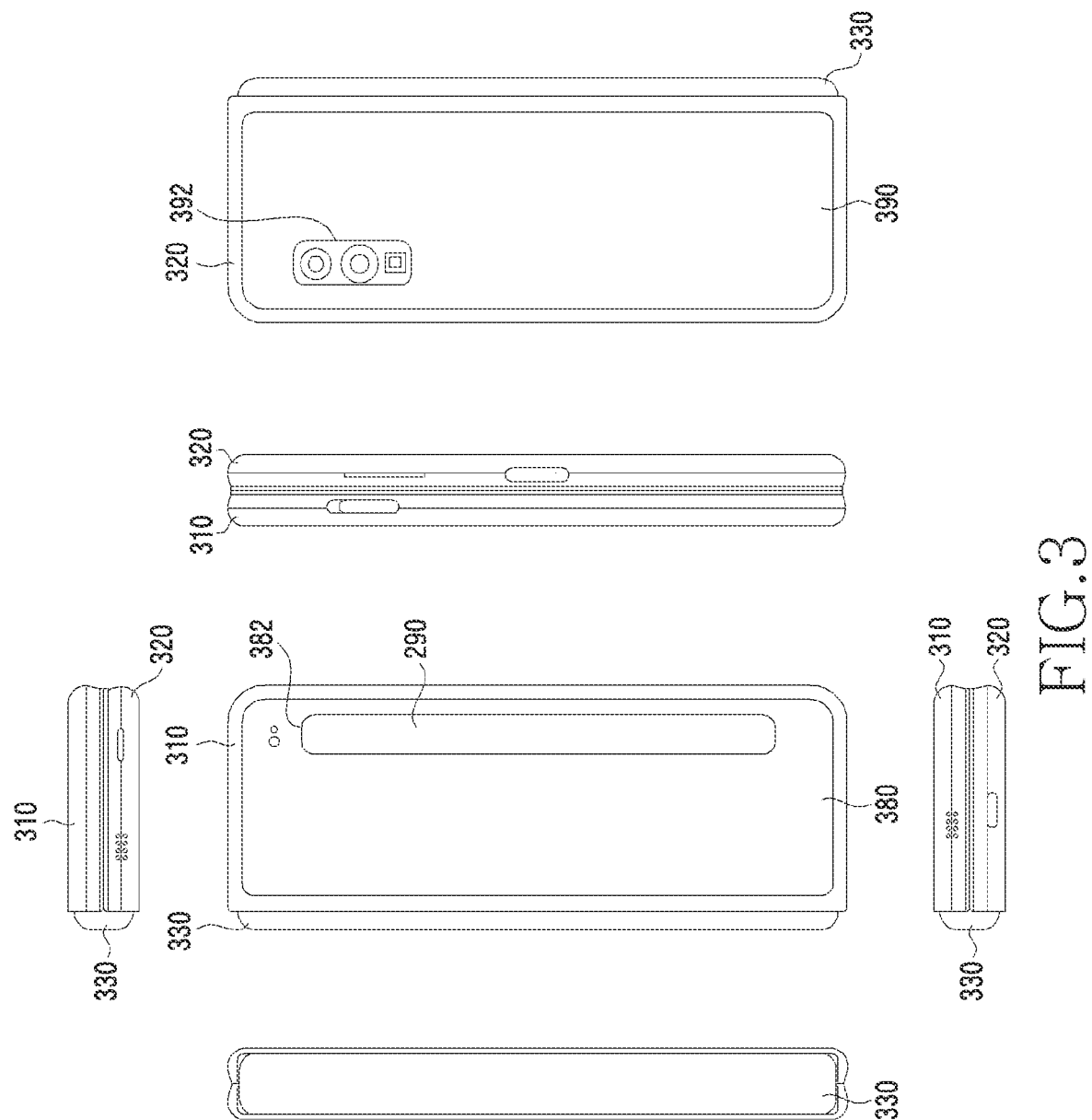
FIG. 3 is a diagram illustrating a folded state of an electronic device according to various embodiments.
Figure 4:
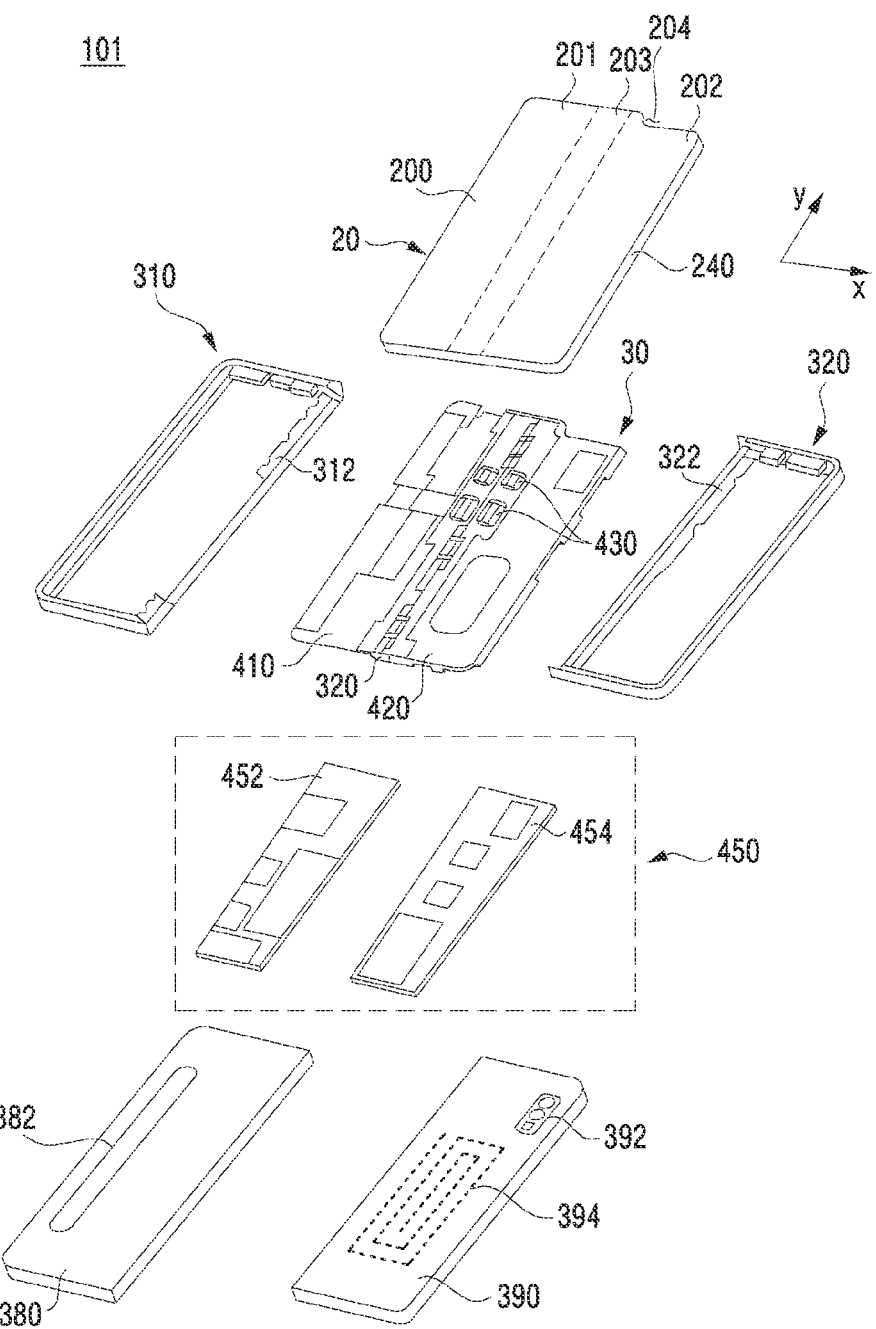
FIG. 4 is an exploded perspective view of an electronic device according to various embodiments.

According to various embodiments of the present invention, the electronic device 101 may include a bar type including one plate or a flexible (foldable) type including a plurality of plates, as shown in FIGS. 2 through 4 below.

FIG. 2 is a diagram illustrating an unfolded state of an electronic device according to various embodiments. FIG. 3 is a diagram illustrating a folded state of an electronic device according to various embodiments.

Referring to FIGS. 2 and 3, in an embodiment, the electronic device 101 may include a foldable housing 300, a hinge cover 330 that covers a foldable portion of the foldable housing 300, and a flexible or foldable display 200 (hereinafter, abbreviated to the "display 200") that is disposed in a space formed by the foldable housing 300. In this disclosure, a surface on which the display 200 is disposed is defined as a first surface or a front surface of the electronic device 101. A surface opposite to the front surface is defined as a second surface or a rear surface of the electronic device 101. A surface that surrounds a space between the front surface and the rear surface is defined as a third surface or a side surface of the electronic device 101.

In an embodiment, the foldable housing 300 may include a first housing structure 310, a second housing structure 320 including a sensor area 324, a first back cover 380, and a second back cover 390. The foldable housing 300 of the electronic device 101 is not limited to the form and the coupling illustrated in FIGS. 2 and 3 and may be implemented by a combination and/or a coupling of other shapes or parts. For example, in another embodiment, the first housing structure 310 and the first back cover 380 may be integrally formed with each other, and the second housing structure 320 and the second back cover 390 may be integrally formed with each other.

In the illustrated embodiment, the first housing structure 310 and the second housing structure 320 may be disposed on opposite sides of a folding axis (an axis A) and may have substantially symmetrical shapes with respect to the folding axis A. As will be described below, the angle or distance between the first housing structure 310 and the second housing structure 320 may vary depending on whether the electronic device 101 is in a flat, folded, or intermediate state. In the illustrated embodiment, unlike the first housing structure 310, the second housing structure 320 may additionally include the sensor area 324 in which various sensors are arranged, but may have a symmetrical shape in the other area. However, this is merely exemplary, and the present invention is not limited thereto. For example, the second housing structure 320 does not include the sensor area 324, and may have a shape symmetrical to the first housing structure 310.

In an embodiment, as illustrated in FIG. 2, the first housing structure 310 and the second housing structure 320 may form a recess together in which the display 200 is received. In the illustrated embodiment, due to the sensor area 324, the recess may have two or more different widths in a direction perpendicular to the folding axis A.

For example, the recess may have (1) a first width w1 between a first portion 310a of the first housing structure 310 that is parallel to the folding axis A and a first portion 320a of the second housing structure 320 that is formed on the periphery of the sensor area 324 and (2) a second width w2 formed by a second portion 310b of the first housing structure 310 and a second portion 320b of the second housing structure 320 that does not correspond to the sensor area 324 and that is parallel to the folding axis A. In this case, the second width w2 may be formed to be longer than the first width w1. In other words, the first portion 310a of the first housing structure 310 and the first portion 320a of the second housing structure 320 that have asymmetrical shapes may form the first width w1 of the recess, and the second portion 310b of the first housing structure 310 and the second portion 320b of the second housing structure 320 that have symmetrical shapes may form the second width w2 of the recess. In an embodiment, the first portion 320a and the second portion 320b of the second housing structure 320 may have different distances from the folding axis A. The widths of the recess are not limited to the illustrated examples. In various embodiments, the recess may have a plurality of widths by the form of the sensor area 324 or by the portions of the first housing structure 310 and the second housing structure 320 that have asymmetrical shapes.

In an embodiment, at least a part of the first housing structure 310 and the second housing structure 320 may be formed of metal or non-metal having strength selected to support the display 200.

In an embodiment, the sensor area 324 may be formed to have a predetermined area adjacent to one corner of the second housing structure 320. However, the arrangement, shape, and size of the sensor area 324 are not limited to the illustrated example. For example, in another embodiment, the sensor area 324 may be provided in another corner of the second housing structure 320 or in any area between an upper corner and a lower corner of the second housing structure 320. In an embodiment, parts embedded in the electronic device 101 to perform various functions may be exposed on the front surface of the electronic device 101 though the sensor area 324 or through one or more openings formed in the sensor area 324. In various embodiments, the parts may include various types of sensors. The sensors may include, for example, at least one of a front camera, a receiver, or a proximity sensor.

The first back cover 380 may be disposed on one side of the folding axis A on the rear surface of the electronic device 101 and may have, for example, a substantially rectangular periphery that is surrounded by the first housing structure 310. Similarly, the second back cover 390 may be disposed on an opposite side of the folding axis A on the rear surface of the electronic device 101 and may have a periphery surrounded by the second housing structure 320.

In the illustrated embodiment, the first back cover 380 and the second back cover 390 may have substantially symmetrical shapes with respect to the folding axis (the axis A). However, the first back cover 380 and the second back cover 390 do not necessarily have symmetrical shapes, and in another embodiment, the electronic device 101 may include the first back cover 380 and the second back cover 390 in various shapes. In another embodiment, the first back cover 380 may be integrally formed with the first housing structure 310, and the second back cover 390 may be integrally formed with the second housing structure 320.

In an embodiment, the first back cover 380, the second back cover 390, the first housing structure 310, and the second housing structure 320 may form a space in which various parts (e.g., a printed circuit board or a battery) of the electronic device 101 are disposed. In an embodiment, one or more parts may be disposed or visually exposed on the rear surface of the electronic device 101. For example, at least part of a sub-display 290 may be visually exposed through a first rear area 382 of the first back cover 380. In another embodiment, one or more parts or sensors may be visually exposed through a second rear area 392 of the second back cover 390. In various embodiments, the sensors may include a proximity sensor and/or a rear camera.

Referring to FIG. 3, the hinge cover 330 may be disposed between the first housing structure 310 and the second housing structure 320 to hide internal parts (e.g., hinge structures). In an embodiment, the hinge cover 330 may be hidden by part of the first housing structure 310 and part of the second housing structure 320, or may be exposed to the outside, depending on a state (e.g., a flat state or a folded state) of the electronic device 101.

For example, when the electronic device 101 is in a flat state as illustrated in FIG. 2, the hinge cover 330 may be hidden by the first housing structure 310 and the second housing structure 320 and thus may not be exposed. In another example, when the electronic device 101 is in a folded state (e.g., a fully folded state) as illustrated in FIG. 3, the hinge cover 330 may be exposed between the first housing structure 310 and the second housing structure 320 to the outside. In another example, when the electronic device 101 is in an intermediate state in which the first housing structure 310 and the second housing structure 320 are folded with a certain angle, the hinge cover 330 may be partially exposed between the first housing structure 310 and the second housing structure 320 to the outside. However, in this case, the exposed area may be smaller than that when the electronic device 101 is in a fully folded state. In an embodiment, the hinge cover 330 may include a curved surface.

The display 200 may be disposed in the space formed by the foldable housing 300. For example, the display 200 may be mounted in the recess formed by the foldable housing 300 and may form almost the entire front surface of the electronic device 101.

Accordingly, the front surface of the electronic device 101 may include the display 200, and a partial area of the first housing structure 310 and a partial area of the second housing structure 320 that are adjacent to the display 200. The rear surface of the electronic device 101 may include the first back cover 380, a partial area of the first housing structure 310 that is adjacent to the first back cover 380, the second back cover 390, and a partial area of the second housing structure 320 that is adjacent to the second back cover 390.

The display 200 may refer to a display, at least a partial area of which is able to be transformed into a flat surface or a curved surface. In an embodiment, the display 200 may include a folding area 203, a first area 201 disposed on one side of the folding area 203 (on a left side of the folding area 203 illustrated in FIG. 2), and a second area 202 disposed on an opposite side of the folding area 203 (on a right side of the folding area 203 illustrated in FIG. 2).

The areas of the display 200 illustrated in FIG. 2 are illustrative, and the display 200 may be divided into a plurality of (e.g., four or more, or two) areas according to a structure or function of the display 200. For example, in the embodiment illustrated in FIG. 2, the areas of the display 200 may be divided from each other by the folding area 203 or the folding axis (the axis A) that extends in parallel to the y-axis. However, in another embodiment, the display 200 may be divided into areas with respect to another folding area (e.g., a folding area parallel to the x-axis) or another folding axis (e.g., a folding axis parallel to the x-axis).

The first area 201 and the second area 202 may have substantially symmetrical shapes with respect to the folding area 203. However, unlike the first area 201, the second area 202 may include a notch 204 that is cut according to the presence of the sensor area 324, but in the other area, the second area 202 may be symmetric to the first area 201. In other words, the first area 201 and the second area 202 may each include a portion having a symmetrical shape and a portion having an asymmetrical shape. However, this is merely exemplary, and the present invention is not limited thereto. For example, the second area may include the sensor area 324 of a punch hole type instead of the cut notch.

Hereinafter, operations of the first housing structure 310 and the second housing structure 320 and the areas of the display 200 according to states (e.g., a flat state and a folded state) of the electronic device 101 will be described.

In an embodiment, when the electronic device 101 is in a flat state (e.g., FIG. 2), the first housing structure 310 and the second housing structure 320 may be arranged to face the same direction while forming an angle of 180 degrees. The surface of the first area 201 of the display 200 and the surface of the second area 202 thereof may face the same direction (e.g., face away from the front surface of the electronic device 101) while forming an angle of 180 degrees. The folding area 203 may form the same plane together with the first area 201 and the second area 202.

In an embodiment, when the electronic device 101 is in a folded state (e.g., FIG. 3), the first housing structure 310 and the second housing structure 320 may be arranged to face each other. The surface of the first area 201 of the display 200 and the surface of the second area 202 thereof may face each other while forming a narrow angle (e.g., an angle between 0 degrees and 10 degrees). At least part of the folding area 203 may form a curved surface having a predetermined curvature.

In an embodiment, when the electronic device 101 is in an intermediate state (e.g., FIG. 3), the first housing structure 310 and the second housing structure 320 may be arranged to have a certain angle therebetween. The surface of the first area 201 of the display 200 and the surface of the second area 202 thereof may form an angle that is greater than that in the folded state and is smaller than that in the flat state. At least part of the folding area 203 may form a curved surface having a predetermined curvature, and the curvature may be smaller than that in the folded state.

In an embodiment, at least one of the first housing structure 310 or the second housing structure 320 may include at least one reception coil for receiving power from a transmission coil of a wireless power transmitting unit.

FIG. 4 is an exploded perspective view of an electronic device according to various embodiments.

Referring to FIG. 4, in an embodiment, the electronic device 101 may include a display unit 20, a bracket assembly 30, a substrate 450, the first housing structure 310, the second housing structure 320, the first back cover 380, and the second back cover 390. In this disclosure, the display unit 20 may be referred to as the display module or the display assembly.

The display unit 20 may include the display 200 and at least one plate or layer 240 on which the display 200 is mounted. In an embodiment, the plate 240 may be disposed between the display 200 and the bracket assembly 30. The display 200 may be disposed on at least part of one surface (e.g., an upper surface with respect to FIG. 4) of the plate 240. The plate 240 may be formed in a shape corresponding to the display 200. For example, a partial area of the plate 240 may be formed in a shape corresponding to the notch 204 of the display 200.

The bracket assembly 30 may include a first bracket 410, a second bracket 420, hinge structures disposed between the first bracket 410 and the second bracket 420, the hinge cover 330 that covers the hinge structures when viewed from the outside, and a wiring member 430 (e.g., a flexible printed circuit (FPC)) that traverses the first bracket 410 and the second bracket 420.

In an embodiment, the bracket assembly 30 may be disposed between the plate 240 and the substrate 450. For example, the first bracket 410 may be disposed between the first area 201 of the display 200 and a first substrate 452. The second bracket 420 may be disposed between the second area 202 of the display 200 and a second substrate 454.

In an embodiment, at least a part of the wiring member 430 and the hinge structures 300 may be disposed inside the bracket assembly 30. The wiring member 430 may be arranged in a direction (e.g., the x-axis direction) across the first bracket 410 and the second bracket 420. The wiring member 430 may be arranged in a direction (e.g., the x-axis direction) that is perpendicular to a folding axis (e.g., the y-axis or the folding axis A of FIG. 2) of the folding area 203 of the electronic device 101.

As mentioned above, the substrate 450 may include the first substrate 452 disposed at the first bracket 410 side and the second substrate 454 disposed at the second bracket 420 side. The first substrate 452 and the second substrate 454 may be disposed in a space that is formed by the bracket assembly 30, the first housing structure 310, the second housing structure 320, the first back cover 380, and the second back cover 390. Parts for implementing various functions of the electronic device 101 may be mounted on the first substrate 452 and the second substrate 454.

The first housing structure 310 and the second housing structure 320 may be assembled so as to be coupled to opposite sides of the bracket assembly 30 in the state in which the display unit 20 is coupled to the bracket assembly 30. As will be described herein, the first housing structure 310 and the second housing structure 320 may slide on the opposite sides of the bracket assembly 30 and may be coupled with the bracket assembly 30.

In an embodiment, the first housing structure 310 may include a first rotation support surface 312, and the second housing structure 320 may include a second rotation support surface 322 corresponding to the first rotation support surface 312. The first rotation support surface 312 and the second rotation support surface 322 may include curved surfaces that correspond to curved surfaces included in the hinge cover 330.

In an embodiment, when the electronic device 101 is in a flat state (e.g., the electronic device 101 of FIG. 2), the first rotation support surface 312 and the second rotation support surface 322 may cover the hinge cover 330 such that the hinge cover 330 is not exposed, or is exposed to a minimum, on the rear surface of the electronic device 101. Meanwhile, when the electronic device 101 is in a folded state (e.g., the electronic device 101 of FIG. 3), the first rotation support surface 312 and the second rotation support surface 322 may rotate along the curved surfaces included in the hinge cover 330, such that the hinge cover 330 is exposed on the rear surface of the electronic device 101 to the maximum.

In an embodiment, the electronic device 101 may include a charging coil 394 for the wireless charging (e.g., a power reception or power transmission coil). For example, the charging coil 394 may be disposed between the second substrate 454 and the second rear cover 390. According to an embodiment, the charging coil 394 may be disposed on one surface of the second rear cover 390 which faces the second substrate 454. According to some embodiment, the charging coil 394 may be disposed inside the second rear cover 390. According to some embodiment, the charging coil 394 may be disposed on one surface of the second substrate 454 which faces the second rear cover 390. However, this is merely exemplary, and the present invention is not limited thereto. For example, the charging coil 394 may be disposed between the display 200 and the second rear cover 390.

Figure 5:
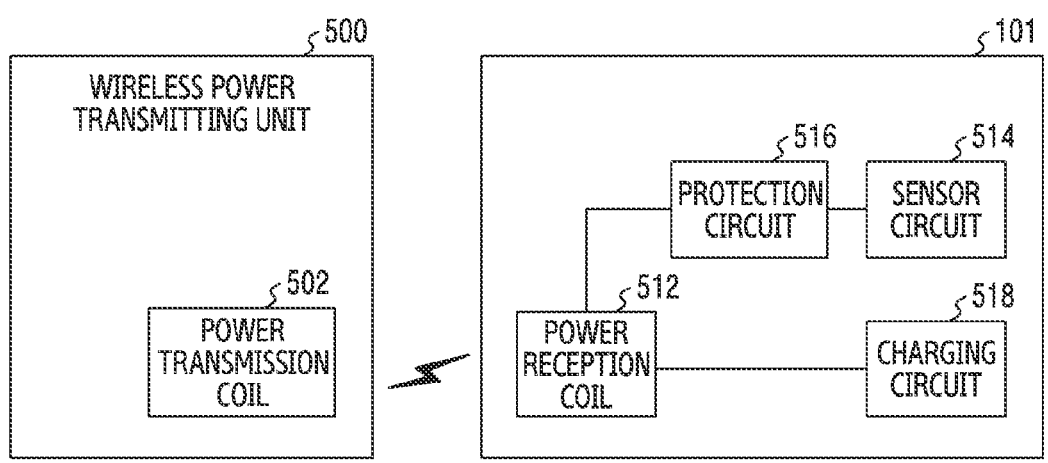
FIG. 5 is a system structure for wireless charging of an electronic device according to various embodiments.

FIG. 5 is a system structure for wireless charging of an electronic device according to various embodiments. In the following descriptions, the electronic device may include the electronic device 101 of FIG. 1 or at least part of the electronic device 101.

According to an embodiment, a wireless power transmitting unit 500 may wirelessly provide power required by the electronic device 101 to the electronic device 101 using a power transmission coil 502. The wireless power transmitting unit 500 may perform a ping operation which periodically (e.g., every 0.5 seconds) outputs a ping signal for identifying a wireless power receiving unit (e.g., the electronic device 101) or an object (e.g., a key or a coin) which contacts or approaches for the wireless charging, through the power transmission coil 502. The ping signal may include analog ping having a specific power, and the analog ping is described as an example in the following descriptions. For example, the wireless power transmitting unit 500 may periodically output the analog ping with maximum power (e.g., 5V) of the wireless power transmitting unit 500.

According to an embodiment, if load of the wireless power transmitting unit 500 is changed within a reference range based on the transmission of the analog ping, the wireless power transmitting unit 500 may determine that the electronic device 101 for the wireless charging is close to the wireless power transmitting unit 500. For example, if the analog ping is transmitted and then the power wirelessly transmitted through the power transmission coil 502 decreases to a specific level, the wireless power transmitting unit 500 may determine a power reception coil 512 of the electronic device 101 for the wireless charging approaches the power transmission coil 502.

According to an embodiment, if determining that the electronic device 101 for the wireless charging approaches the wireless power transmitting unit 500, the wireless power transmitting unit 500 may radiate the power to the electronic device 101 using the power transmission coil 502. In this case, the wireless power transmitting unit 500 may stop the transmission of the analog ping. For example, the power transmission coil 502 may output electromagnetic waves for the wireless charging of the electromagnetic induction scheme.

According to an embodiment, if determining that the electronic device 101 for the wireless charging does not approach the wireless power transmitting unit 500, the wireless power transmitting unit 500 may perform the ping operation to identify an object (e.g., the electronic device 101) which contacts or approaches for the charging. For example, the wireless power transmitting unit 500 may transmit an analog ping. In addition, even if detecting the contact or the approach of an electronic device not supporting the wireless charging (e.g., an electronic device without a power reception coil mounted), the wireless power transmitting unit 500 may determine that the electronic device 101 for the wireless charging does not approach the wireless power transmitting unit 500.

According to an embodiment, the electronic device 101 may include the power reception coil 512, a sensor circuit 514, a protection circuit 516 and a charging circuit 518. The power reception coil 512 may wirelessly receive the power through the magnetic induction scheme with the power transmission coil 502 of the wireless power transmitting unit 500. For example, the power reception coil 512 may receive the analog ping periodically transmitted by the wireless power transmitting unit 500 through the power transmission coil 502. For example, the power reception coil 512 may include a conductive coil.

According to an embodiment, the sensor circuit 514 may identify a wireless charging status based on the analog ping outputted by the ping operation of the wireless power transmitting unit 500. The analog ping periodically outputted with the maximum power (e.g., 5V) by the wireless power transmitting unit 500 may be received through the power reception coil 512 for a reference time (e.g., 2 seconds through 4 seconds), and the sensor circuit 514 may identify the wireless charging status of the electronic device 101 based on the number of the received analog pings and a voltage level of the received analog ping. For example, if receiving a second analog ping of which the voltage level exceeds a reference level (e.g., 0.7 v through 1.4 v) for the reference time from a time of receiving a first analog ping over a reference number (e.g., 4 through 5), the sensor circuit 514 may determine that the electronic device 101 is abnormally mounted on the wireless power transmitting unit 500. That is, the sensor circuit 514 may determine that the electronic device 101 is not wirelessly charged. However, this is merely an example, and the present invention is not limited thereto. For example, if a sum of the number of the second analog pings of which the voltage level exceeds the reference level (e.g., 0.7 v through 1.4 v) and the number of the first analog pings exceeds a reference number (e.g., 5 through 6), it may be determined that the electronic device 101 is abnormally mounted on the wireless power transmitting unit 500. As another example, if receiving the second analog ping of which the voltage level exceeds the reference level (e.g., 0.7 v through 1.4 v) for the reference time from the time of receiving the first analog ping below the reference number (e.g., 4 through 5), the sensor circuit 514 may determine that the electronic device 101 is normally mounted on the wireless power transmitting unit 500. That is, the sensor circuit 514 may determine that the electronic device 101 is wirelessly charged. As described above, if the sum of the number of the second analog pings of which the voltage level exceeds the reference level (e.g., 0.7 v through 1.4 v) and the number of the first analog pings falls below the reference number (e.g., 5 through 6), it may be determined that the electronic device 101 is normally mounted on the wireless power transmitting unit 500. As yet another example, if receiving the second analog ping of which the voltage level falls below the reference level (e.g., 0.7 v through 1.4 v) for the reference time from the time of receiving the first analog ping, the sensor circuit 514 may determine that the electronic device 101 is not mounted on the wireless power transmitting unit 500. For example, the sensor circuit 514 may be driven based on the power of the analog ping received through the power reception coil 512. That is, the sensor circuit 514 may be driven if receiving the analog ping over the reference level through the power reception coil 512. However, this is only exemplary, and the present invention is not limited thereto. For example, the sensor circuit 514 may be driven based on power provided from a battery (e.g., the battery 189 of FIG. 1) of the electronic device 101.

According to an embodiment, the electronic device 101 (e.g., the processor 120 of FIG. 1) may provide a user interface based on the wireless charging status of the electronic device 101 obtained through the sensor circuit 514. For example, the processor 120 may control to display the user interface corresponding to the wireless charging status of the electronic device 101 on a display device (e.g., the display device 160 of FIG. 1).

According to an embodiment, the protection circuit 516 may be electrically connected between the power reception coil 512 and the sensor circuit 514, and may block overvoltage applied to the sensor circuit 514. For example, the protection circuit 516 may include an electrostatic discharge (ESD) diode, a Zener diode and/or a Schottky diode.

According to an embodiment, the charging circuit 518 may charge the battery (e.g., the battery 189 of FIG. 1) of the electronic device 101 using the power obtained through the power reception coil 512.

As described above, the sensor circuit 514 of the electronic device 101 according to various embodiments may identify the wireless charging status of the electronic device 101. However, this is only an example, and the present invention is not limited thereto. For example, the wireless charging status of the electronic device 101 may be identified, by the charging circuit 518 of the electronic device 101. For example, the charging circuit 518 may perform a similar or identical operation to the sensor circuit 514 for identifying the wireless charging status of the electronic device 101 based on the number of the analog pings and the voltage level received through the power reception coil 512 for the reference time. If the charging circuit 518 of the electronic device 101 identifies the wireless charging status of the electronic device 101 based on the number of the analog pings and the voltage level received through the power reception coil 512 for the reference time according to an embodiment, at least part of the protection circuit 516 or the sensor circuit 514 may be included in the charging circuit 518 or may be omitted.

Figure 6:
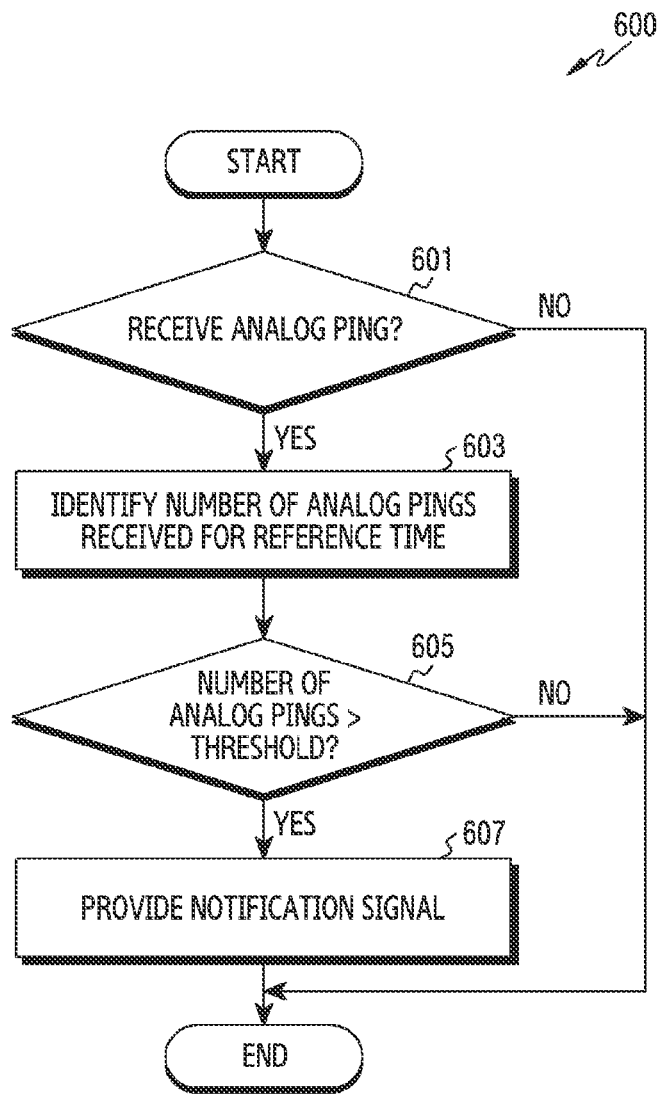
FIG. 6 is a flowchart for providing a charging status based on the number of analog pings in an electronic device according to various embodiments.
Figure 7:
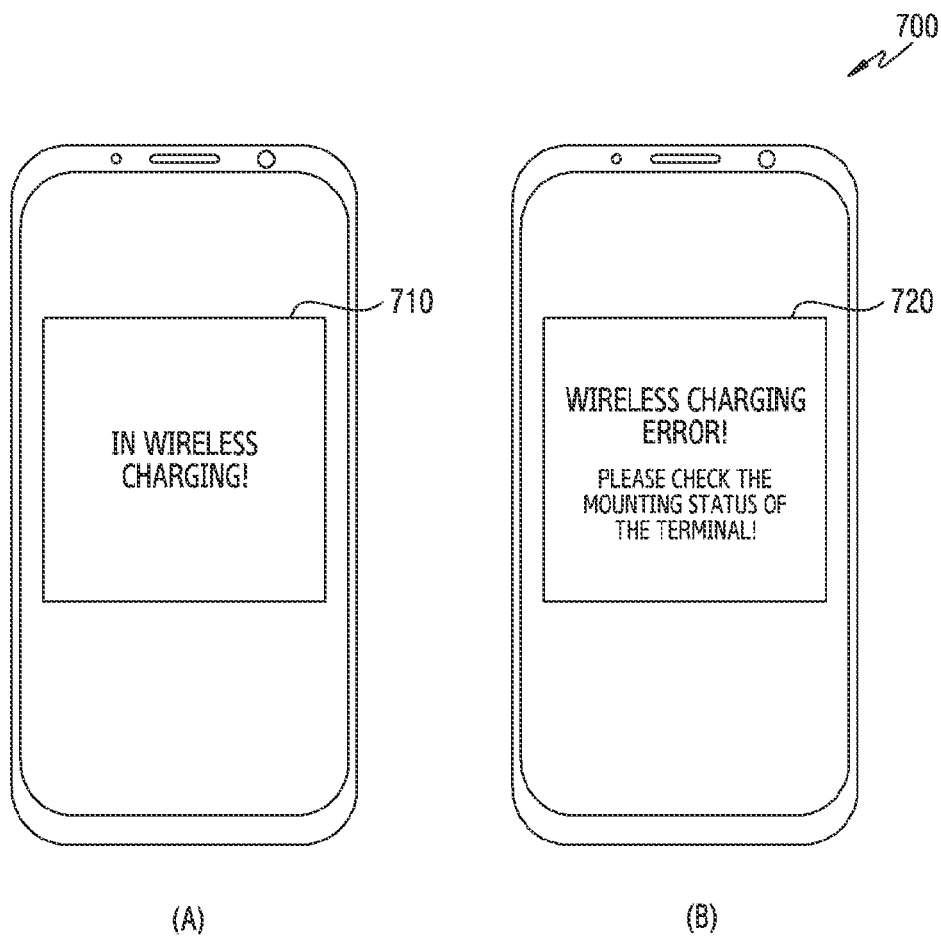
FIG. 7 is a screen configuration for outputting a charging status according to various embodiments.

FIG. 6 is a flowchart 600 for providing a charging status based on the number of analog pings in an electronic device according to various embodiments. FIG. 7 is a screen configuration 700 for outputting a charging status according to various embodiments. In the following descriptions, the electronic device may include the electronic device 101 of FIG. 1 or FIG. 5 or at least part of the electronic device 101.

Referring to FIG. 6, the electronic device 101 (e.g., the sensor circuit 514) according to various embodiments may identify whether an analog ping periodically transmitted from the wireless power transmitting unit 500 is received, in operation 601. For example, the sensor circuit 514 may identify whether the power periodically radiated from the wireless power transmitting unit 500 is received through the power reception coil 512 of FIG. 5. According to an embodiment, the sensor circuit 514 may identify whether an analog ping exceeding a reference level (e.g., 0.7 v through 1.4 v) is received, through the power reception coil 512. For example, if receiving an analog ping below the reference level, the sensor circuit 514 may ignore the received analog ping and thus determine that the analog ping is not received.

According to various embodiments, if not receiving the analog ping periodically transmitted from the wireless power transmitting unit 500 (e.g., 'NO' of operation 601 of FIG. 6), the electronic device 101 (e.g., the sensor circuit 514) may determine that the electronic device 101 is not mounted on the wireless power transmitting unit 500.

If receiving the analog ping periodically transmitted from the wireless power transmitting unit 500 (e.g., 'YES' of operation 601 of FIG. 6), the electronic device 101 (e.g., the sensor circuit 514) according to various embodiments may identify the number of analog pings received for the reference time, in operation 603. For example, the sensor circuit 514 may identify the number of second analog pings received for the reference time (e.g., 2 seconds through 4 seconds) after receiving a first analog ping through the power reception coil 512. For example, the sensor circuit 514 may be driven with the power obtained through the first analog ping.

In operation 605, the electronic device 101 (e.g., the sensor circuit 514) according to various embodiments may identify whether the number of the analog pings received for the reference time exceeds a predefined threshold (e.g., five through six), in operation 605. For example, as mentioned above in FIG. 5, the sensor circuit 514 may identify whether the number of the second analog pings received for the reference time after receiving the first analog ping through the power reception coil 512 exceeds the threshold. For example, the sensor circuit 514 may identify whether the number of the first analog pings and the second analog pings received exceeds a predefined threshold (e.g., five through six). In some embodiment, the sensor circuit 514 may identify whether the number of the second analog pings exceeds a predefined threshold (e.g., four through five).

The electronic device 101 (e.g., the sensor circuit 514) according to various embodiments may provide a notification signal corresponding to the abnormal wireless charging status, if the number of the analog pings received for the reference time exceeds the predefined threshold (e.g., 'YES' of operation 605 of FIG. 6), in operation 607. For example, if receiving the second analog pings exceeding the threshold in number for the reference time through the power reception coil 512, the sensor circuit 514 may determine that the electronic device 101 is abnormally mounted on the wireless power transmitting unit 500. The sensor circuit 514 may transmit abnormal mounting status information to the processor 120 (e.g., an AP). The processor 120 may control at least one of the sound output device 155, the display device 160 or an indicator (e.g., an LED module) to output a user interface based on the abnormal mounting status information. For example, the processor 120 may control to display a message 720 requesting to identify the abnormal mounting status of the electronic device 101 on the display device 160, as shown in (b) of FIG. 7.

In an embodiment, if the number of the second analog pings received for the reference time falls below the predefined threshold (e.g., five through six) (e.g., 'NO' of operation 605 of FIG. 6), the electronic device 101 (e.g., the sensor circuit 514) may determine that the electronic device 101 is normally mounted on the wireless power transmitting unit 500. For example, the electronic device 101 (e.g., the processor 120) may control to display a message 710 indicating that the electronic device 101 is being wirelessly charged on the display device 160, as shown in (a) of FIG. 7.

Figure 8:
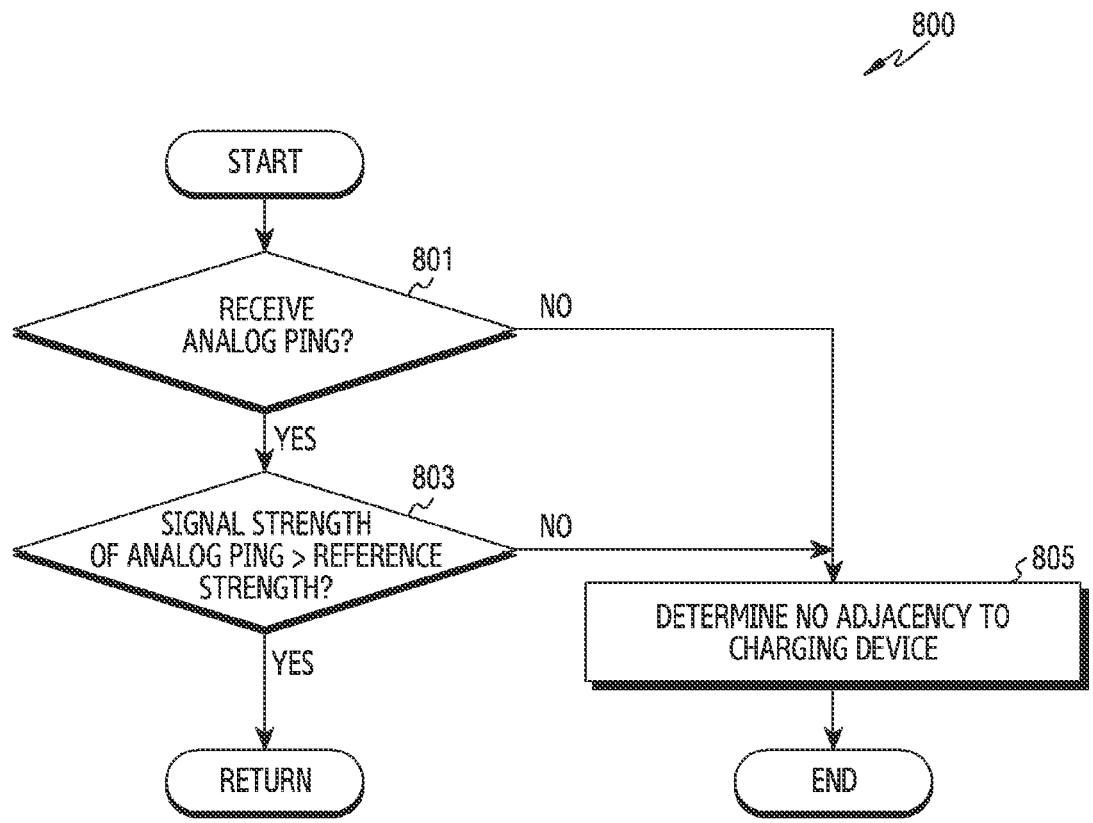
FIG. 8 is a flowchart for identifying a valid analog ping in an electronic device according to various embodiments.
Figure 9:
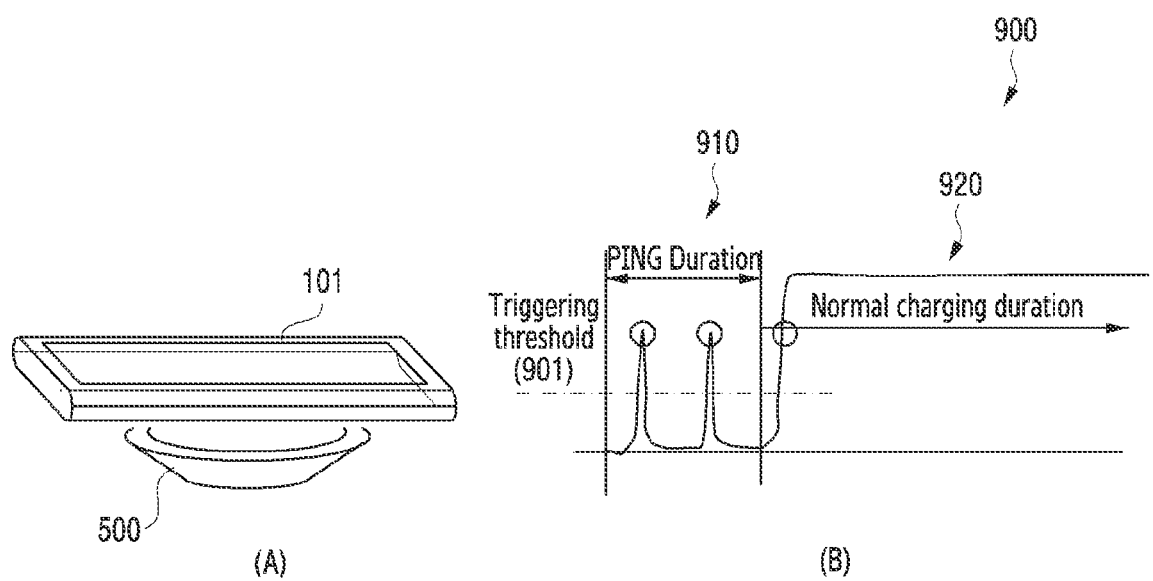
FIG. 9 is a diagram illustrating an electronic device normally mounted on a wireless charging transmitting unit according to various embodiments.
Figure 10:
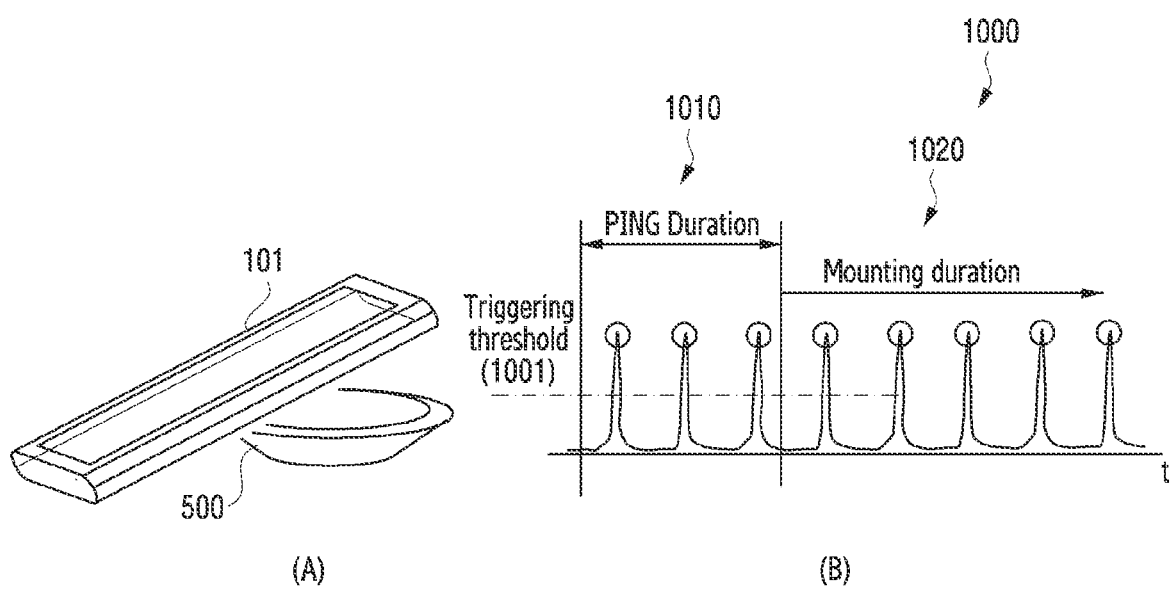
FIG. 10 is a diagram illustrating an electronic device abnormally mounted on a wireless charging transmitting unit according to various embodiments.
Figure 11:
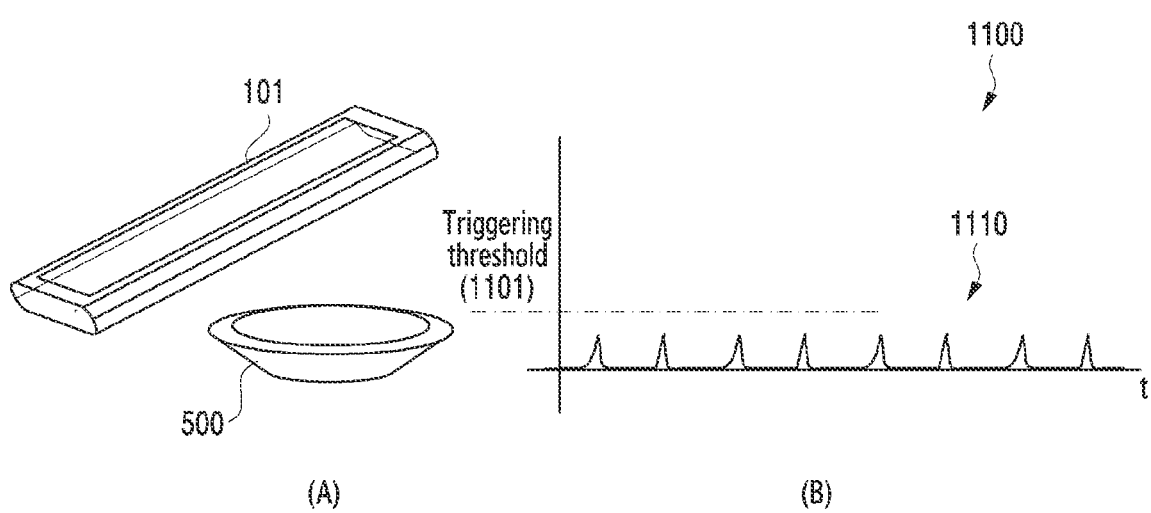
FIG. 11 is a diagram illustrating an electronic device not mounted on a wireless charging transmitting unit according to various embodiments.

FIG. 8 is a flowchart 800 for identifying a valid analog ping in an electronic device according to various embodiments. FIG. 9 is a diagram 900 illustrating an electronic device normally mounted on a wireless charging transmitting unit according to various embodiments. FIG. 10 is a diagram 1000 illustrating an electronic device abnormally mounted on a wireless charging transmitting unit according to various embodiments. FIG. 11 is a diagram 1100 illustrating an electronic device not mounted on a wireless charging transmitting unit according to various embodiments. The following descriptions may be operation of receiving the analog ping, in operation 601 of FIG. 6. In the following descriptions, the electronic device may include the electronic device 101 of FIG. 1 or FIG. 5 or at least part of the electronic device 101.

Referring to FIG. 8, the electronic device 101 (e.g., the sensor circuit 514) may determine whether an analog ping is received through the power reception coil 512, in operation 801. For example, the power reception coil 512 may receive the analog ping, through the magnetic induction scheme based on the power (the analog ping) periodically radiated through the power transmission coil 502 of the wireless power transmitting unit 500 of FIG. 5.

If receiving the analog ping through the power reception coil 512 (e.g., 'YES' of operation 801 of FIG. 8), the electronic device (e.g., the sensor circuit 514) according to an embodiment may identify whether a signal strength of the analog ping exceeds a reference strength (e.g., 0.7 v through 1.4 v), in operation 803. For example, the sensor circuit 514 may identify whether the voltage obtained through the magnetic induction scheme of the power reception coil 512 exceeds the reference level.

If the signal strength of the analog ping exceeds the reference strength (e.g., 'YES' of operation 803 of FIG. 8), the electronic device 101 (e.g., the sensor circuit 514) according to an embodiment may determine that the analog ping transmitted from the wireless power transmitting unit 500 is received. For example, if the electronic device 101 is normally mounted on the wireless power transmitting unit 500, as shown in (a) of FIG. 9, the electronic device 101 may receive an analog ping exceeding a reference strength 901 in a duration 910 where the wireless power transmitting unit 500 transmits the analog ping, as shown in (b) of FIG. 9. For example, if determining that the electronic device 101 is normally mounted on the wireless power transmitting unit 500, the wireless power transmitting unit 500 may continuously supply the power for the wireless charging of the electronic device 101, as shown in (a) of FIG. 9. Hence, the electronic device 101 may wirelessly receive the power, through the power reception coil 512 in a normal charging duration 920, as shown in (b) of FIG. 9.

According to an embodiment, if the electronic device 101 is abnormally mounted on the wireless power transmitting unit 500, the electronic device 101 may receive an analog ping exceeding a reference strength 1010 in a duration 1010 where the wireless power transmitting unit 500 transmits the analog ping, as shown in (b) of FIG. 10. For example, if determining that the electronic device 101 is abnormally mounted on the wireless power transmitting unit 500, as shown in (a) of FIG. 10, the wireless power transmitting unit 500 may maintain the periodic analog ping transmission. In an embodiment, the wireless power transmitting unit 500 may maintain the analog ping transmission if the power wirelessly transmitted through the power transmission coil 502 does not reduce to a specific level after the transmission of the analog ping. Hence, the electronic device 101 may continuously receive the analog ping in a mounting duration 1020, as shown in (b) of FIG. 10. Thus, the electronic device 101 may identify the abnormal wireless charging status of the electronic device 101 based on the number of the analog pings received during the reference time after receiving the first analog ping.

If the analog ping is not received through the power reception coil 512 (e.g., 'NO' of operation 801 of FIG. 8), or if the signal strength of the analog ping falls below the reference strength (e.g., 'NO' of operation 803 of FIG. 8), the electronic device (e.g., the sensor circuit 514) according to various embodiments may determine that the electronic device 101 is not close to the wireless power transmitting unit, in operation 805. For example, as shown in (a) of FIG. 11, if the electronic device 101 is not mounted on the wireless power transmitting unit 500 and is positioned within a specific distance from the wireless power transmitting unit 500, the electronic device 101 may receive an analog ping below a reference strength 1101 in a duration 1110 where the wireless power transmitting unit 500 transmits the analog ping, as shown in (b) of FIG. 11. Thus, if receiving the analog ping below the reference strength 1101, the electronic device 101 may determine that the electronic device 101 is not mounted on the wireless power transmitting unit.

Figure 12:
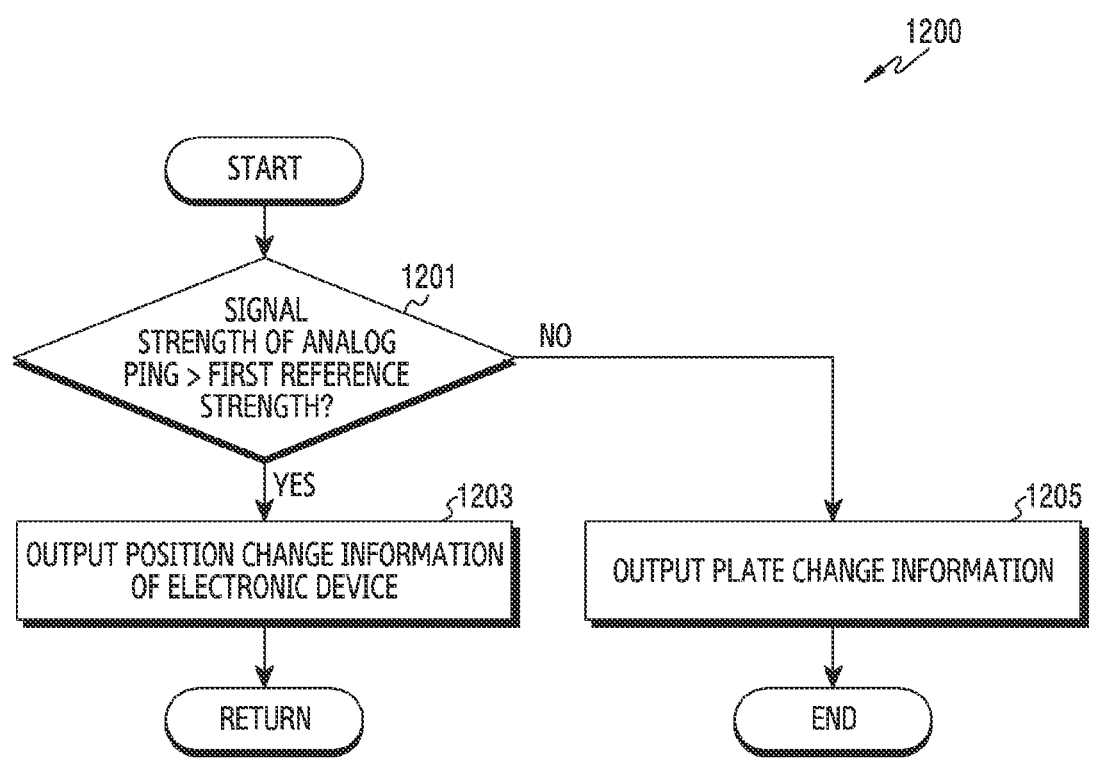
FIG. 12 is a flowchart for outputting a charging status based on an analog ping strength in an electronic device according to various embodiments.
Figure 13:
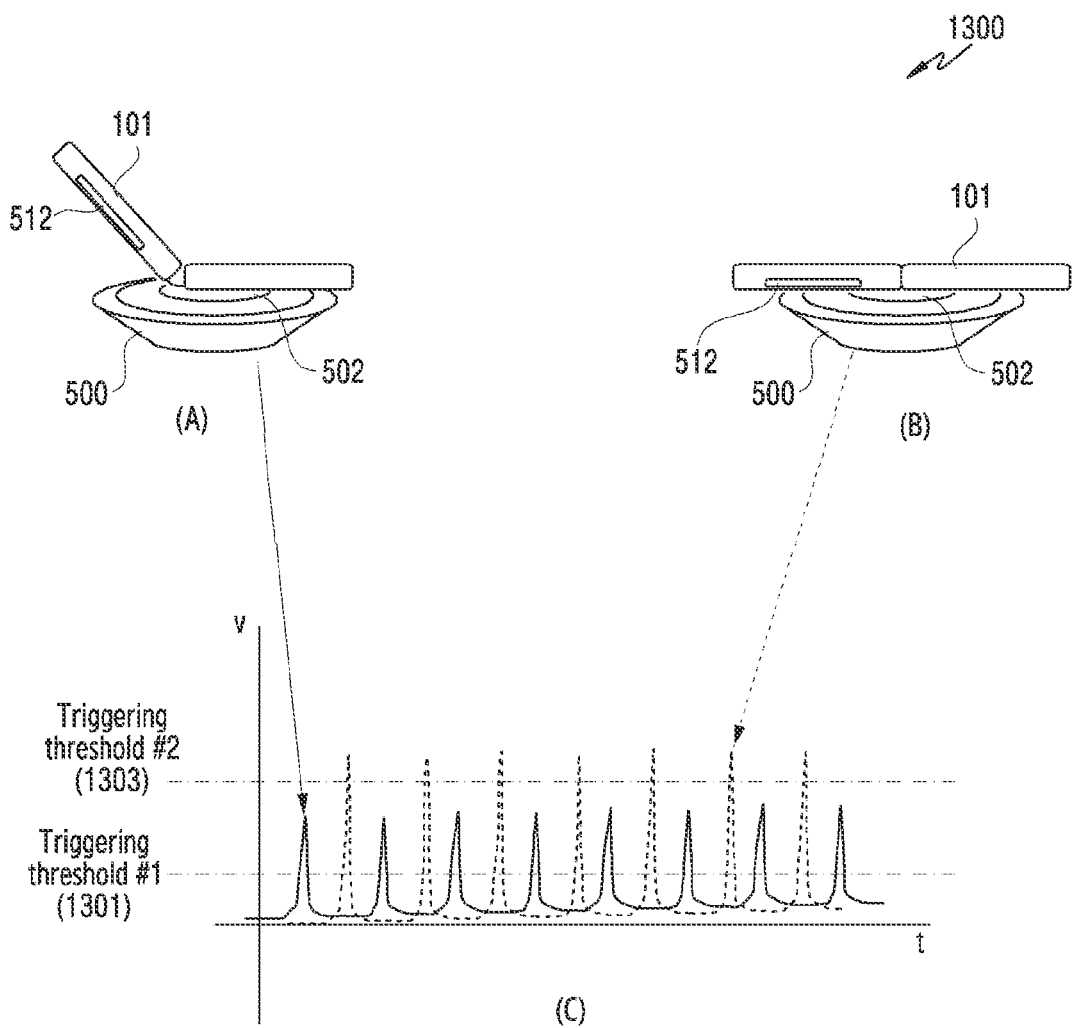
FIG. 13 is a diagram illustrating an electronic device mounted in an unfolded state on a wireless charging transmitting unit according to various embodiments.
Figure 14:
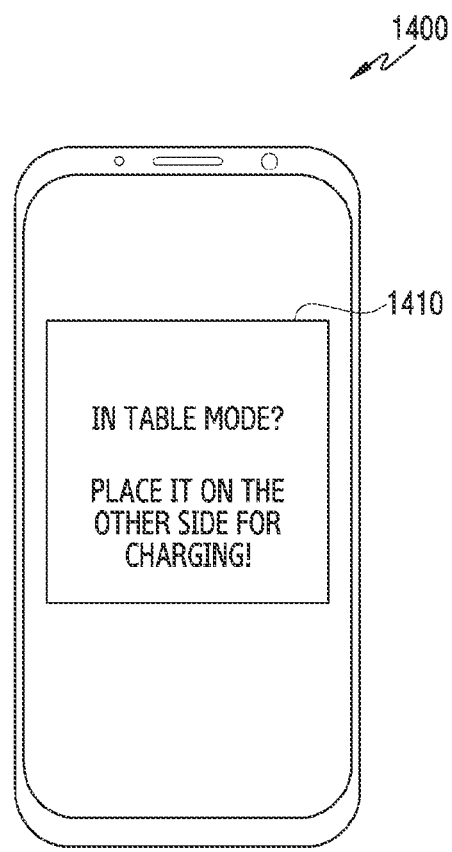
FIG. 14 is a screen configuration for outputting a charging status according to various embodiments.

FIG. 12 is a flowchart 1200 for outputting a charging status based on an analog ping strength in an electronic device according to various embodiments. FIG. 13 is a diagram 1300 illustrating an electronic device mounted in an unfolded state on a wireless charging transmitting unit according to various embodiments. FIG. 14 is a screen configuration 1400 for outputting a charging status according to various embodiments. The following descriptions may be operation of providing the notification signal, in operation 607 of FIG. 6. In the following descriptions, the electronic device may include the electronic device 101 of FIG. 1 or FIG. 5 or at least part of the electronic device 101.

Referring to FIG. 12, if the number of the analog pings received for the reference time exceeds the reference number (e.g., 'YES' of operation 605 of FIG. 6), the electronic device 101 (e.g., the sensor circuit 514) according to an embodiment may identify whether the signal strength of the analog ping exceeds a first reference strength (e.g., 1.4 v), in operation 1201.

If the signal strength of the analog ping exceeds a second reference strength (e.g., 1.4 v) (e.g., 'YES' of operation 1201 of FIG. 12), the electronic device 101 (e.g., the sensor circuit 514) according to various embodiments may determine that the electronic device 101 is abnormally mounted on the wireless power transmitting unit 500 and provide a notification signal related to a position change of the electronic device 101, in operation 1203. For example, if the signal strength of the analog ping received during the reference time exceeds a second reference strength 1303 (see the dotted-line arrow), as shown in (b) of FIG. 13 and (c) of FIG. 13, the sensor circuit 514 may determine that the position of the power reception coil 512 of the electronic device 101 does not match the power transmission coil 502 of the wireless power transmitting unit 500. Hence, the sensor circuit 514 may provide a notification signal related to the abnormal mounting status of the electronic device 101 to the processor 120 (e.g., an AP). For example, the processor 120 may control to display the message 720 requesting to identify the abnormal mounting status of the electronic device 101 on the display device 160, as shown in (b) of FIG. 7.

If the signal strength of the analog ping is smaller than the second reference strength (e.g., 1.4 v) and exceeds the first reference strength (e.g., 0.7 v), (e.g., 'NO' of operation 1201 of FIG. 12), the electronic device 101 (e.g., the sensor circuit 514) according to various embodiments may determine that a plate of the electronic device 101 is mounted incorrectly and thus provide a notification signal related to the plate change, in operation 1205. For example, as shown in (a) of FIG. 13 and (c) of FIG. 13, if the signal strength of the analog pings received for the reference time is smaller than the second reference strength 1303 and exceeds the first reference strength 1301 (see the solid-line arrow), the sensor circuit 514 may determine that the plate close to the wireless power transmitting unit 500 is wrong in the electronic device 101 which is driving in a table mode. Accordingly, the sensor circuit 514 may provide a notification signal related to the plate change of the electronic device 101 to the processor 120 (e.g., an AP). Based on the notification signal related to the plate change of the electronic device 101, the processor 120 may control to display on the display device 160 a message 1410 requesting to change the plate contacting the wireless power transmitting unit 500 in the electronic device 101 which operates in the table mode, as shown in FIG. 14. For example, the table mode may include an operation mode which is set to use one plate as a display device and use the other plate as an input device, like a notebook, in the electronic device 101 including a plurality of plates which may be unfolded and folded, as shown in FIG. 2 through FIG. 4.

An electronic device 101 according to various embodiments may include a housing including a first plate 310, a second plate 320 facing away from the first plate 310, and a side surface member 330 for at least partially surrounding a space between the first plate 310 and the second plate 320, a display 200 positioned in the space and viewed through the first plate 310, a conductive coil 512 parallel to the second plate 320 and disposed between the display 200 and the second plate 320, a wireless charging circuit 518 electrically connected to the conductive coil 512, a sensor circuit 514 electrically connected to the wireless charging circuit 518 and the conductive coil 512, and a processor 120 operatively connected with the display 200, the wireless charging circuit 518 and the sensor circuit 517, wherein the sensor circuit 517 may receive a first analog ping signal for wireless charging from an external electronic device 500, through the conductive coil 512, receive at least one second analog ping signal within a time selected after the first analog ping signal received, count the number of the second analog ping signals received within the selected time, and provide a notification signal to the processor if the number exceeds a first threshold. According to an embodiment, the selected time may include 2 seconds through 4 seconds after receiving the first analog ping signal. According to an embodiment, the first threshold may include four through five.

According to various embodiments, the electronic device 101 may further include a memory 130 operatively connected with the processor 120, wherein the memory 130 may store instructions for, when executed, causing the processor 120 to receive a notification signal from the sensor circuit 514, and provide a user interface, based on the notification signal through the display 200.

According to various embodiments, the electronic device 101 may further include a protection circuit 516 electrically connected between the conductive coil 512 and the sensor circuit 514, wherein the protection circuit 516 may include an ESD diode, a Zener diode and/or a Schottky diode.

According to various embodiments, the first analog ping signal and/or the second analog ping signal may include a voltage of 0.7 through 1.4V.

An electronic device 101 according to various embodiments may include a housing including a first plate 310, a second plate 320 facing away from the first plate 310, and a side surface member 330 for at least partially surrounding a space between the first plate 310 and the second plate 320, a display 200 positioned in the space and viewed through the first plate 310, a conductive coil 512 parallel to the second plate 320 and disposed between the display 200 and the second plate 320, a wireless charging circuit 518 electrically connected to the conductive coil 512 and a processor 120 operatively connected with the display 200 and the wireless charging circuit 518, wherein the wireless charging circuit 518 may receive a first analog ping signal for wireless charging from an external electronic device 500, through the conductive coil 512, receive at least one second analog ping signal within a time selected after the first analog ping signal received, count the number of the second analog ping signals received within the selected time, and provide a notification signal to the processor 120 if the number exceeds a first threshold. According to an embodiment, the selected time may include 2 seconds through 4 seconds after receiving the first analog ping signal. According to an embodiment, the first threshold may include four through five.

According to various embodiments, the electronic device 101 may further include a memory 130 operatively connected with the processor 120, wherein the memory 130 may store instructions for, when executed, causing the processor 120 to receive a notification signal from the wireless charging circuit 518, and provide a user interface, based on the notification signal of the electronic device through the display 200.

According to various embodiments, the wireless charging circuit may determine that the electronic device is normally mounted on the external electronic device if the number of the received second analog ping signals exceeds the first threshold.

According to various embodiments, the first analog ping signal and/or the second analog ping signal may include a voltage of 0.7 through 1.4V.

An electronic device 101 according to various embodiments may include a housing 300, a display 200 viewed through a part of the housing 300, a conductive coil 512, a wireless charging circuit 518 electrically connected to the conductive coil 512, a sensor circuit 514 electrically connected to the wireless charging circuit 518 and the conductive coil 512 and a processor 120 operatively connected with the display 200, the wireless charging circuit 518 and the sensor circuit 517, wherein the sensor circuit 514 may receive at least one analog ping signal for wireless charging from an external electronic device 500, through the conductive coil 512, and identify a wireless charging status of the electronic device based on the number and a strength of the analog ping signals received for a reference time. According to an embodiment, the reference time may include 2 seconds through 4 seconds after a first analog ping signal is received.

According to various embodiments, if the number of the analog ping signals received for the reference time exceeds a first threshold and the signal strength of the analog ping exceeds a second threshold, the sensor circuit 514 may determine that the electronic device 101 is abnormally mounted on the external electronic device 500. According to an embodiment, the first threshold may include five through six, and the second threshold may include a voltage of 0.7 through 1.4V.

According to various embodiments, if the number of the analog ping signals received for the reference time falls below a first threshold and the signal strength of the analog ping exceeds a second threshold, the sensor circuit 514 may determine that the electronic device 101 is normally mounted on the external electronic device 500.

According to various embodiments, if the number of the analog ping signals received for the reference time falls below a second threshold, the sensor circuit 514 may determine that the electronic device 101 is not mounted on the external electronic device 500.

According to various embodiments, the electronic device 101 may further include a memory 130 operatively connected with the processor 120, wherein the memory 130 may store instructions for, when executed, causing the processor 120 to receive a notification signal from the sensor circuit 514, and provide a user interface, based on the wireless charging status of the electronic device 101 through the display 200.

According to various embodiments, the electronic device 101 may further include a protection circuit 519 electrically connected between the conductive coil 512 and the sensor circuit 514, wherein the protection circuit 516 may include an electrostatic discharge (ESD) diode, a Zener diode and/or a Schottky diode.

An operating method of an electronic device 101 according to various embodiments may include receiving at least one analog ping signal for wireless charging from an external electronic device 500, through a conductive coil 512 of the electronic device 101 and identifying a wireless charging status of the electronic device 101 based on the number and a strength of the analog ping signals received for a reference time.

According to various embodiments, the reference time may include 2 seconds through 4 seconds after a first analog ping signal is received.

According to various embodiments, identifying the wireless charging status may include, if the number of the analog ping signals received for the reference time exceeds a first threshold and the signal strength of the analog ping exceeds a second threshold, determining that the electronic device 101 is abnormally mounted on the external electronic device 500.

According to various embodiments, the first threshold may include five through six, and the second threshold may include a voltage of 0.7 through 1.4V.

According to various embodiments, identifying the wireless charging status may include, if the number of the analog ping signals received for the reference time falls below a first threshold and the signal strength of the analog ping exceeds a second threshold, determining that the electronic device 101 is normally mounted on the external electronic device 500.

According to various embodiments, identifying the wireless charging status may include, if the number of the analog ping signals received for the reference time falls below a second threshold, determining that the electronic device 101 is not mounted on the external electronic device 500.

According to various embodiments, the operating method of the electronic device 101 may include providing a user interface through a display 200 of the electronic device 101, based on the wireless charging status of the electronic device 101.

Meanwhile, various embodiments of the present invention have been described, but various modifications may be made without departing from the scope of various embodiments of the present invention. Therefore, the scope of various embodiments of the present invention should not be limited to the described embodiments but should be defined by the claims to be described and their equivalents.

The invention claimed is:

1. An electronic device comprising:
a housing;
a display viewed through a part of the housing;
a conductive coil;
a wireless charging circuit electrically connected to the conductive coil;
a sensor circuit electrically connected to the wireless charging circuit and the conductive coil; and
a processor operatively connected with the display, the wireless charging circuit and the sensor circuit,
wherein the sensor circuit is configured to:
receive at least one analog ping signal for wireless charging from an external electronic device, through the conductive coil,
identify a wireless charging status of the electronic device based on a number and a strength of the analog ping signals received for a reference time, and
if the number of the analog ping signals received for the reference time exceeds a first threshold and the strength of the analog ping signals received for the reference time exceeds a second threshold, determine that the electronic device is abnormally mounted on the external electronic device.

2. The electronic device of claim 1, wherein the reference time comprises 2 seconds through 4 seconds after a first analog ping signal is received.

3. The electronic device claim 1, wherein the first threshold comprises five through six, and the second threshold comprises a voltage of 0.7 through 1.4V.

4. The electronic device of claim 1, wherein the sensor circuit is further configured to, if the number of the analog ping signals received for the reference time falls below the first threshold and the strength of the analog ping signals exceeds the second threshold, determine that the electronic device is normally mounted on the external electronic device.

5. The electronic device of claim 1, wherein the sensor circuit is further configured to, if the strength of the analog ping signals received for the reference time falls below the second threshold, determine that the electronic device is not mounted on the external electronic device.

6. The electronic device of claim 1, further comprising a memory operatively connected with the processor,
wherein the memory stores instructions, which when executed, cause the processor to;
receive a notification signal from the sensor circuit, and
provide a user interface, based on the wireless charging status of the electronic device through the display.

7. The electronic device of claim 1, further comprising a protection circuit electrically connected between the conductive coil and the sensor circuit,
wherein the protection circuit comprises an electrostatic discharge (ESD) diode, a Zener diode and/or a Schottky diode.

8. An operating method of an electronic device, comprising:
receiving at least one analog ping signal for wireless charging from an external electronic device, through a conductive coil of the electronic device; and
identifying a wireless charging status of the electronic device based on a number and a strength of the analog ping signals received for a reference time,
wherein identifying the wireless charging status comprises:
if the number of the analog ping signals received for the reference time exceeds a first threshold and the strength of the analog ping signals received for the reference time exceeds a second threshold, determining that the electronic device is abnormally mounted on the external electronic device.

9. The method of claim 8, wherein the reference time comprises 2 seconds through 4 seconds after a first analog ping signal is received.

10. The method of claim 8, wherein the first threshold comprises five through six, and the second threshold comprises a voltage of 0.7 through 1.4V.

11. The method of claim 8, wherein identifying the wireless charging status comprises:
if the number of the analog ping signals received for the reference time falls below the first threshold and the strength of the analog ping signals exceeds the second threshold, determining that the electronic device is normally mounted on the external electronic device.

12. The method of claim 8, wherein identifying the wireless charging status comprises:
if the strength of the analog ping signals received for the reference time falls below the second threshold, determining that the electronic device is not mounted on the external electronic device.

13. The method of claim 8, further comprising:
providing a user interface through a display of the electronic device, based on the wireless charging status of the electronic device.

* * * * *